(12) United States Patent
Tajima et al.

(10) Patent No.: US 6,344,010 B1
(45) Date of Patent: Feb. 5, 2002

(54) TRANSMISSION WITH PLANETARY GEAR MECHANISM AND METHOD FOR ASSEMBLING THE SAME

(75) Inventors: Shigeru Tajima; Masahiro Imamura, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/571,161

(22) Filed: May 16, 2000

(30) Foreign Application Priority Data

May 21, 1999 (JP) ............................. 11-142092

(51) Int. Cl.[7] .............................................. F16H 57/08
(52) U.S. Cl. ........................................ 475/331; 475/346
(58) Field of Search ................................ 475/331, 346, 475/347; 29/464, 898.1

(56) References Cited

U.S. PATENT DOCUMENTS 3,972,106 A * 8/1976 Orr ........................... 29/401 R
5,600,905 A * 2/1997 Kallenberger et al. ........ 37/394
6,067,734 A * 5/2000 Kallenberger ................. 37/395

FOREIGN PATENT DOCUMENTS

JP          1-203740         8/1989

* cited by examiner

Primary Examiner—Charles A. Marmor
Assistant Examiner—Tisha D. Lewis
(74) Attorney, Agent, or Firm—Arent, Fox, Kintner, Plotkin & Kahn, PLLC

(57) ABSTRACT

A first engagement portion 48 is formed on an element 9b to be fixed so as to prohibit the relative rotation of the elements 9b to a case 3a. Fixing members 51 are provided which can freely be inserted into the case 3a from an outer surface of a circumferential wall portion the case 3a, and the fixing members 51 are allowed to be brought into engagement with a second engagement portion 50 formed on the element 9b to be fixed so as to prohibit the axial movement of the element 9b to be fixed relative to the case 3a.

5 Claims, 6 Drawing Sheets

TRANSMISSION WITH PLANETARY GEAR MECHANISM AND METHOD FOR ASSEMBLING THE SAME

BACKGROUND OF THE INVENTION

1. Field of the Invention

The present invention relates to a transmission with a planetary gear mechanism having an element adapted to be fixed to a transmission case and a method for assembling the same.

2. Description of the Related Art

In a conventional transmission of this type, when elements of the planetary gear mechanism such as the ring gear and the carrier are fixed to the transmission case, those elements are splined to the transmission case so that they do not rotate relative to the transmission case, and they are also locked with snap rings so that they do not move axially relative to the transmission case (refer to Japanese Patent Unexamined Publication No. Hei.1-203740).

In order to facilitate the assembling work of transmissions, it is a desirable sequence of assembling transmissions that the transmission constituent members including the planetary gear mechanisms are assembled on the shaft member of the transmission axially sequentially in a predetermined order in an open space outside of the transmission case, and thereafter the transmission constituent members including the planetary gear mechanisms so assembled are installed in the transmission case.

In the conventional transmission, however, in which the element to be fixed of the planetary gear mechanism is locked by the snap ring so as to prohibit the relative axial movement thereof to the transmission case, if the other transmission constituent members are present in front of the planetary gear mechanism when viewed from the side of the transmission case facing the open end thereof, these transmission constituent members hinder the snap ring mounting work. Therefore, it is not possible to subassemble the planetary gear mechanisms on the shaft member together with those transmission constituent members. As a result of this, the transmission constituent members including the planetary gear mechanisms have to be assembled sequentially in an order in which those to be situated toward the deepest end of the transmission case are first assembled, this making the assembly work of transmissions troublesome.

SUMMARY OF THE INVENTION

The present invention was made in view of the aforesaid problem and an object of thereof is to provide a transmission in which elements to be fixed of a planetary gear mechanism can be locked so as to prohibit the relative axial movement thereof to a transmission case through operations from the outer surface of a circumferential wall portion of the transmission case, whereby the assembling efficiency is improved, and a method for assembling the same.

With a view to solving the aforesaid problem, according to the present invention, there is provided a transmission, wherein a first engagement portion is provided on an element of a planetary gear mechanism to be fixed to a transmission case which is adapted to be brought into engagement with the transmission case so as to prohibit the relative rotation of the element to the transmission case, fixing members are provided which can freely be inserted into the interior of the transmission case from an outer surface of a circumferential wall portion of the transmission case, and a second engagement portion is provided on the element which is adapted to be brought into engagement with the fixing members so as to prohibit the relative axial movement of the element to the transmission case.

With a view to assembling the aforesaid transmission with good working efficiency, according to the present invention, there is provided a method for assembling the same transmission comprising the steps of assembling a plurality of transmission constituent members including the planetary gear mechanisms on a shaft member of the transmission axially sequentially in a predetermined order, thereafter installing the plurality of transmission constituent members including the planetary gear mechanisms so assembled in the transmission case, and then inserting the fixing members into the interior of the transmission case.

According to the transmission of the present invention, even if the other transmission constituent members are present in front of the planetary gear mechanism in question on the side of the transmission case facing the open end thereof, the fixing members are inserted into the interior of the transmission case from the outer surface of the circumferential wall portion of the transmission case for engagement thereof with the second engagement portions of the elements to be fixed of the planetary gear mechanisms, whereby the elements can be locked so as to prohibit the relative axial movement thereof to the transmission case.

Consequently, as with the aforesaid transmission assembling method according to the present invention, the transmission constituent members including the planetary gear mechanisms can be subassembled, thereby making it possible to improve the assembling efficiency of transmissions.

DETAILED DESCRIPTION OF THE PREFERRED EMBODIMENTS

Figure 1:
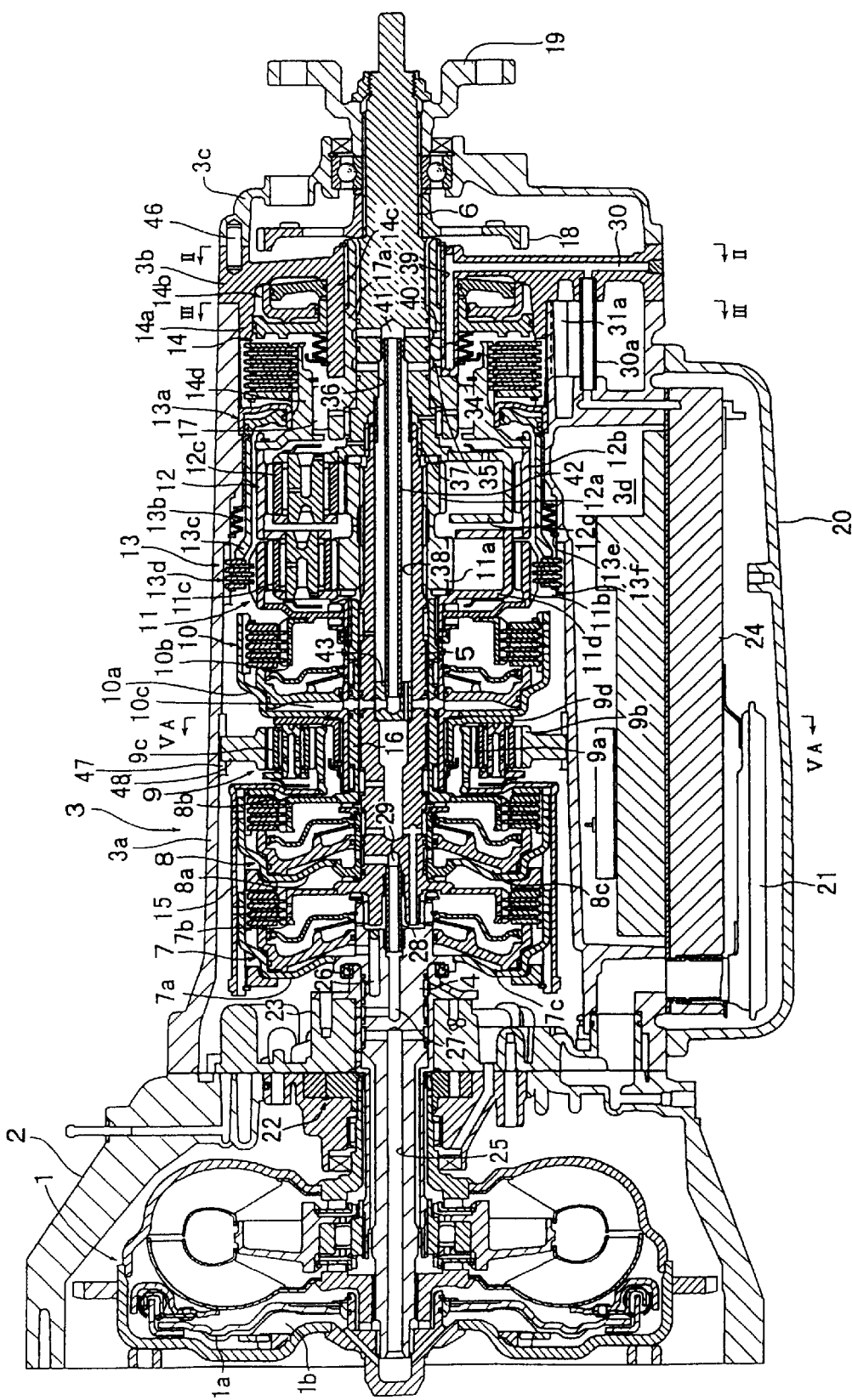
FIG. 1 is a longitudinal cross-sectional view showing one example of a transmission according to the present invention.

FIG. 1 shows an automatic transmission for an automotive vehicle. This automatic transmission comprises a transmission case 3 that is to be connected to a torque converter case 2, in which a fluid torque converter 1 with a lockup clutch 1a is installed. An input shaft 4 which is coupled to the torque converter 1, an intermediate shaft 5 and an output shaft 6 are coaxially and rotatably supported in the transmission case 3. When viewed from the torque converter case 2 side, there are disposed on these shafts 4, 5, 6 sequentially a UD clutch 7, an OD clutch 8, a first planetary gear mechanism 9, a 35R clutch 10, a second planetary gear mechanism 11, and a third planetary gear mechanism 12, and furthermore, a 26 brake 13 is disposed around the circumference of the second planetary gear mechanism 11 and an LR brake 14 is disposed axially in front of the third planetary gear mechanism 12.

The respective planetary gear mechanisms 9, 11, 12 are constituted by sun gears 9a, 11a, 12a, ring gears 9b, 11b, 12b, pinions 9c, 11c, 12c adapted to be in mesh with the sun gears and ring gears, and carries 9d, 11d, 12d for rotatably supporting the pinions.

The sun gear 9a of the first planetary gear mechanism 9 is coupled to an outer sleeve 15 which is splined to clutch outers 7a, 8a of both the UD and OD clutches 7, 8, whereby the clutch outer 7a of the UD clutch 7 is coupled to the input shaft 4, and, together with the clutch outer 7a, the clutch outer 8a of the OD clutch 8 and the sun gear 9a of the first planetary gear mechanism 9 are connected to the input shaft 4. A clutch inner 7b of the UD clutch 7 is coupled to the sun gears 11a, 12a of the second and third planetary gear mechanisms 11, 12 via the intermediate shaft 5, and a clutch inner 8b of the OD clutch 8 is coupled to the carrier 11d of the second planetary gear mechanism 11 via a sleeve 16 rotatably supported on the intermediate shaft 5.

The ring gear 9b of the first planetary gear mechanism 9 is fixed to the transmission case 3 as will be described in detail, and the carrier 9d thereof is coupled to a clutch outer 10a of the 35R clutch 10. A clutch inner 10b of the 35R clutch 10 is coupled to the ring gear 11b of the second planetary gear mechanism 11, and the ring gear 11b is constructed so as to be braked to stop relative to the transmission case 3 by means of the 26 brake 13.

The carrier 1d of the second planetary gear mechanism 11 is coupled to the ring gear 12b of the third planetary gear mechanism 12, and the ring gear 12b is constructed so as to be braked to stop relative to the transmission case 3 by means of the LR brake 14 and is coupled to the transmission case 3 via a one-way clutch 17 acting as a reaction force receiver. In addition, the carrier 12d of the third planetary gear mechanism 12 is coupled to the output shaft 6.

According to the mentioned construction, when the UD clutch 7 engages with the LR brake 14, a first gear is provided, when the UD clutch 7 engages with the 26 brake 13, a second gear is provided, when the UD clutch 7 engages with the 35R clutch 10, a third gear is provided, when the UD clutch 7 engages with the OD clutch 8, a fourth gear is provided, when the OD clutch 8 engages with the 35R clutch 10, a fifth gear is provided, when the OD clutch 8 engages with the 26 brake 13, a sixth gear is provided, and when the 35R clutch 10 engages with the LR brake 14, a reverse gear is provided, thus six forward speeds and one reverse being provided.

The transmission case 3 comprises a case main body 3a, an end piece 3b which is mounted on the case main body 3a at an end portion thereof opposite to the other end portion which faces the torque converter case 2, and an end cover 3c which is mounted on an external surface of the end piece 3b. A parking gear 18 which is coupled to the output shaft 6 is disposed between the end piece 3b and the end cover 3c. An output flange 19 is coupled to an outer end portion of the output shaft 6 which projects outwardly beyond the end cover 3c.

Integrally formed with the end piece 3b are a brake outer 14a of the LR brake 14 and an inner sleeve 14c which accommodates an actuator portion 14b of the LR brake 14 between the brake outer 14 and itself. The one-way clutch 17 is disposed in the inner circumference of a brake inner 14d of the LR brake 14 which is coupled to the ring gear 12b of the third planetary gear mechanism 12, and an inner race 17a of the one-way clutch 17 is fitted in the inner sleeve 14c so as to be fixed to the end piece 3b.

In addition, an actuator portion 13a for the 26 brake 13 is disposed so as to be situated between the third planetary gear mechanism 12 and the LR brake 14. A return spring 13b and an operation sleeve 13c for the 26 brake 13 are disposed in an outer circumferential space of the third planetary gear mechanism 12. And, a disc portion 13d for the 26 brake 13 is interposed between the ring gear 11b of the second planetary gear mechanism 11 and the case main body 3a. The disc portion 13d is operated by the actuator portion 13a via the operation sleeve 13c. The return spring 13b and the disc portion 13d are locked with respect to an axial direction by snap rings 13e, 13f, respectively, relative to the case main body 3a.

An oil pan 20 is provided downwardly outwardly of the case main body 3a via a skirt portion 3d formed integrally with an outer surface of the case main body 3a in such a manner as to extend downwardly therefrom. In addition, a pump 22 for pumping up oil in the oil pan 20 via a strainer 21 is provided in the torque converter case 2 at an end thereof which faces the transmission case 3. Valve blocks 23, 24 are provided in, respectively, the case main body 3a at the end portion facing the torque converter case 2 and the oil pan 20, and the valve blocks 23, 24 each incorporate therein various types of valves in a hydraulic pressure circuit connecting to the pump 22.

Oil is supplied from the valve block 23 provided in the case main body 3a into an actuator portion 1b of a lockup clutch 1a incorporated in the fluid torque converter 1 via an oil hole 25 formed in the input shaft 4, and into an actuator portion 7c of the UD clutch 7 via an oil hole 26 formed in the input shaft 4, and further into an actuator portion 8c of the OD clutch 8 via a oil hole 27 formed in the input shaft 4, a pipe 28 and an oil hole 29 formed in the intermediate shaft 5.

Figure 2:
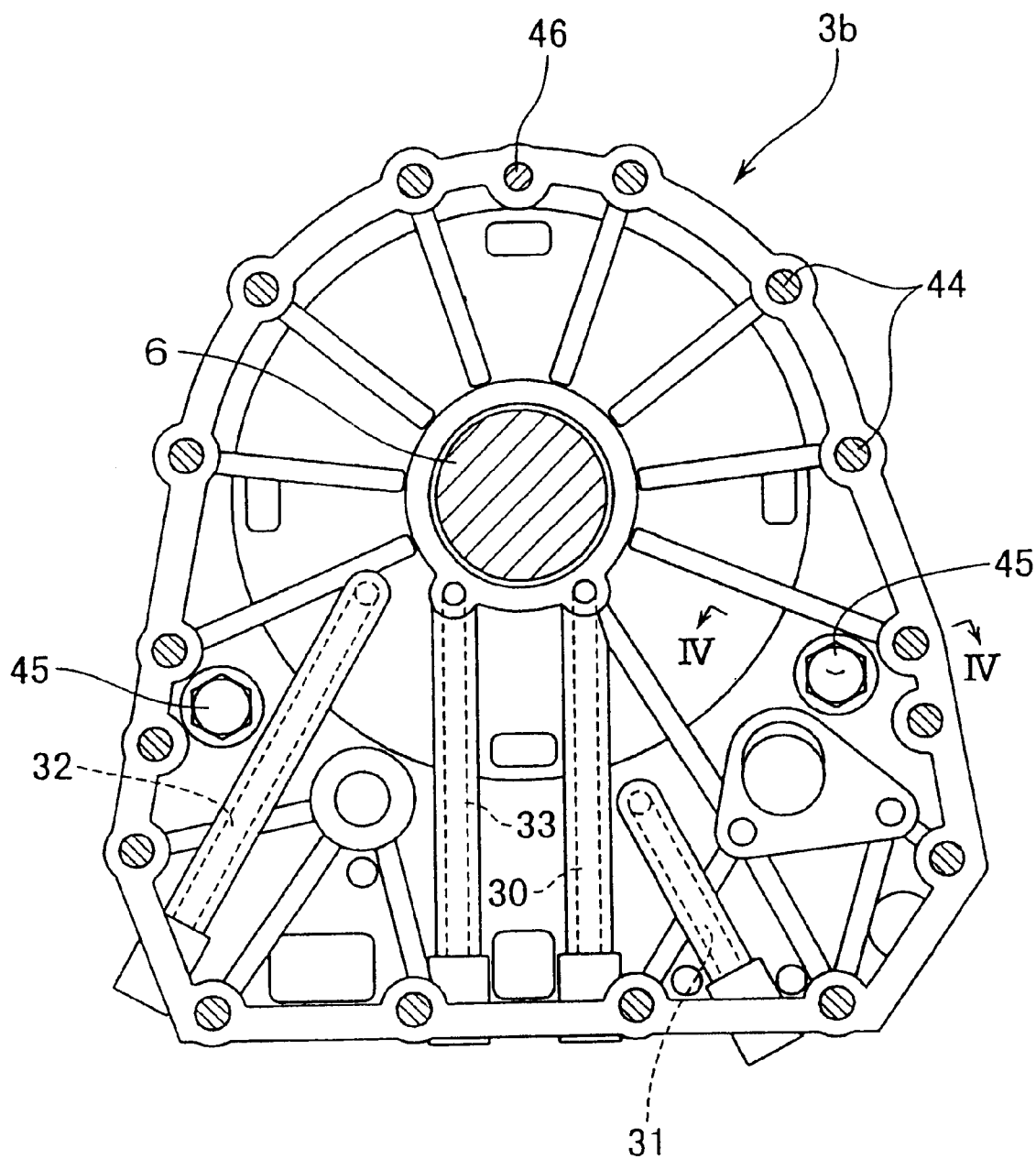
FIG. 2 is a side cross-sectional view of an end piece taken along the line II—II of FIG. 1.
Figure 3:
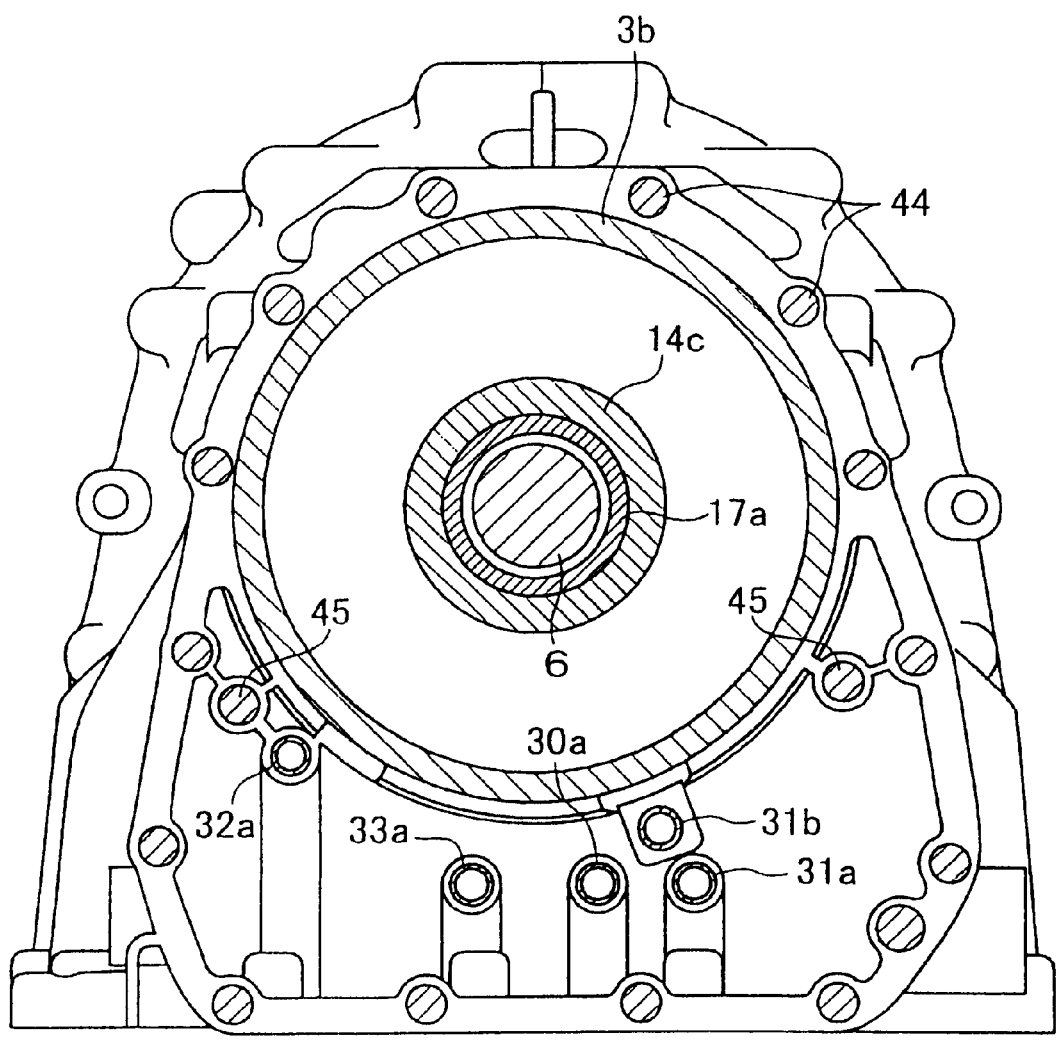
FIG. 3 is a side cross-sectional view of a case main body taken along the line III—III of FIG. 1.

As shown in FIG. 2, formed in an end wall portion of the end piece 3b are an oil passage 30 for the 35R clutch 10, an oil passage 31 for the 26R brake, an oil passage 32 for the LR brake 14 and an oil passage 33 for lubrication. These oil passages 30, 31, 32, 33 are connected to the valve block 24 in the oil pan 20 via respective piping members 30a, 31a, 32a, 33a laid out in the case main body 3a as shown in FIG. 3. Then, lubricating oil is supplied from the oil passage 33 to respective portions around the shafts where lubrication is needed via an oil hole 34 formed in the inner sleeve 14c, an oil hole 35 formed in an inner race 17a, an oil hole 36 formed in the output shaft 6, a bored pipe 37 and an oil hole 38 formed in the intermediate shaft 5. The oil passage 30 is caused to communicate with an actuator portion 10c of the 35R clutch 10 via an oil hole 39 formed in the inner sleeve 14c, an oil hole 40 formed in the inner race 17a, an oil hole 41 formed in the output shaft 6, a pipe 42 provided in the oil holes 36, 38 and a plug 43 in the intermediate shaft 5 which fits on an end of the pipe 42. The oil passage 32 is caused to directly communicate with an actuator portion 14b of the LR brake 14. The oil passage 31 is caused to communicate with the actuator portion 13a of the 26 brake 13 via a piping member 31b connected thereto.

Figure 4:
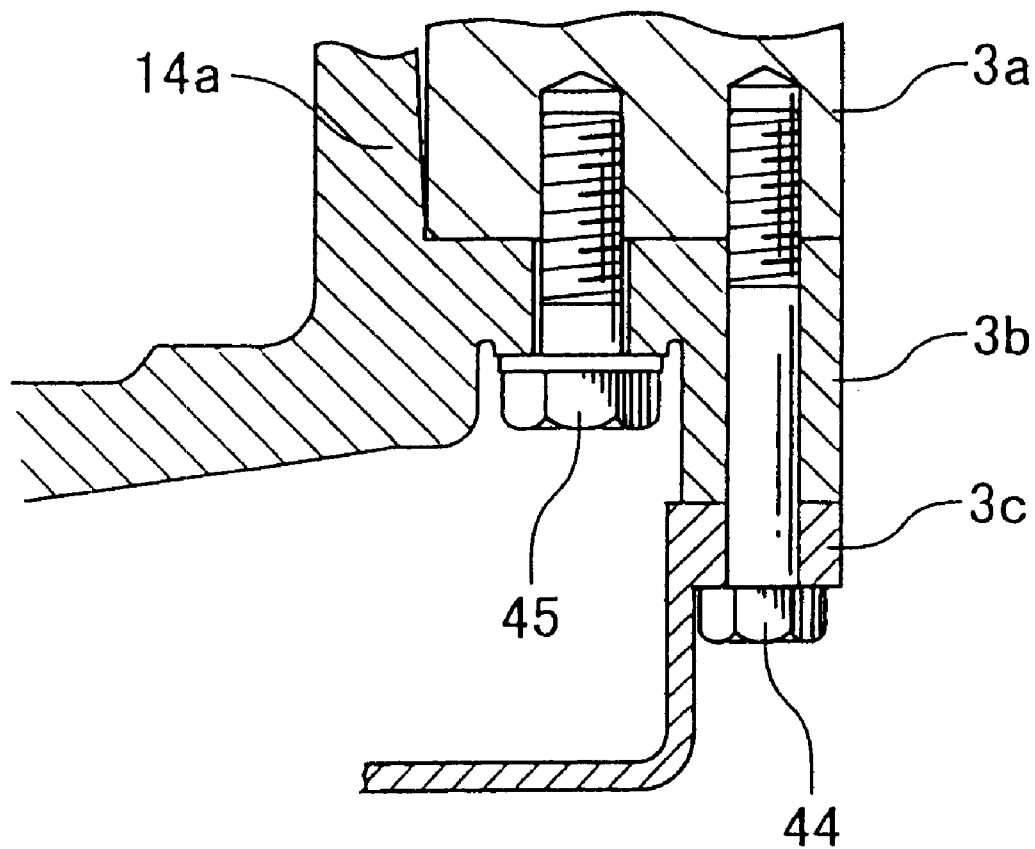
FIG. 4 is a cross-sectional view of the end piece and the case main body taken along the line IV—IV of FIG. 2.

The case main body 3a, end piece 3b and end cover 3c are clamped together with a plurality of bolts 44, but since a biassing force of the return spring 13b of the 26 brake 13 acts on the end piece 3b via the actuator portion 13a of the 26 brake 13, the end piece 3b tends to come apart from the case main body 3a, making it difficult to mount the end cover 3c on the end piece 3b. Then, to cope with this, the end piece 3b is tightly fastened to the case main body 3a with inner bolts 45 at two positions in a part thereof which is covered with the end cover 3c, as shown in FIG. 4, mounting the end cover 3c on the end piece 3b being thus facilitated. In FIG. 1, reference numeral 46 denotes a knock-pin for positioning the end cover 3c relative to the end piece 3c.

Figure 5A:
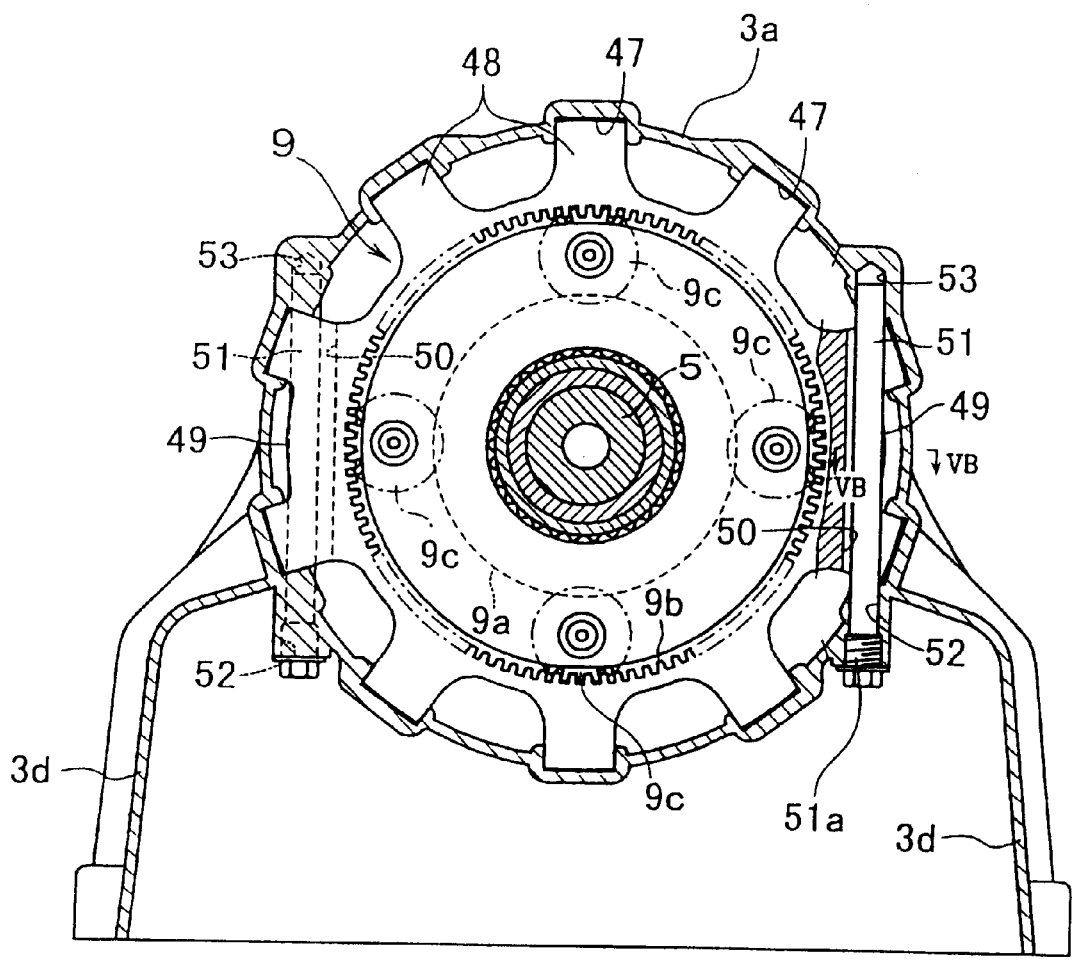
FIG. 5A is. a cross-sectional view taken along the line VA—VA of FIG. 1.
Figure 5B:
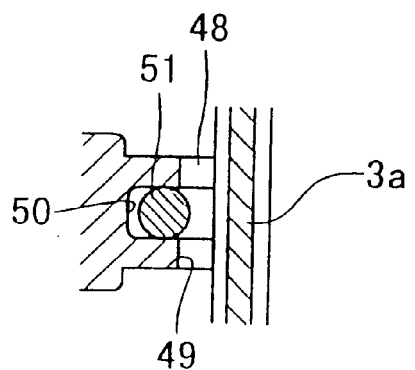
FIG. 5B is a sectional view taken along the line VB—VB of FIG. 5A.

As shown in FIG. 5, a plurality of spline-shaped teeth 48 are formed on an outer circumference of the ring gear 9b of the first planetary gear mechanism 9 as a first engagement portion which corresponds to a plurality of spline-shaped grooves 47 formed in the case main body 3a, whereby the ring gear 9b is prohibited from rotating relative to the transmission case 3 when the teeth 48 are allowed to engage with the grooves 47 from an axial direction, that is, when the ring gear 9b is splined to the transmission case 3. In addition, of roots formed between the teeth 48, the depths of roots 49, 49 situated on horizontal sides of the ring gear 9b are made shallower, and a pair of vertical engagement grooves 50, 50 are formed in the horizontal sides of the ring gear 9b in such a manner as to extend in tangential directions from the lower teeth 48 to the upper teeth 48 of the respective roots 49 as a second engagement portion. Then, a pair of pin-shaped fixing members 51, 51 adapted to be fixed to the case main body 3a are brought into engagement with both the engagement grooves 50, 50, whereby the axial movement of the ring gear 9b is prohibited relative to the transmission case 3.

A pair of insertion holes 52, 52 are formed in lower portions of the circumferential wall portion of the case main body 3a on both sides thereof in such a manner as to penetrate in the tangential directions through the wall portion at positions adjacent to inner sides of the skirt portion 3d. This allows the two fixing members 51, 51 to freely be inserted into the interior of the case main body 3a via the tow insertion holes 52, 52 from below the outer surface of the circumferential wall portion of the case main body 3a. Then, distal end portions of the respective fixing members 51 are fitted in respective concaved holes 53 formed in the tangential directions in upper portions on the sides of the circumferential wall portion of the case main body 3a, and in this state, threaded portions 51a formed at proximal end portions of the respective fixing members 51 are screwed into the respective insertion holes 52, whereby the respective fixing members 51 are fixed to the case main body 3a in a state in which the fixing members 51 are supported on the case main body 3a at the both ends thereof.

While the fixing members can be brought into engagement with the engagement grooves 50 from radial directions of the case main body 3a, according to the present invention, since the fixing member 51 engages with the engagement groove 50 along the tangential direction which is the longitudinal direction thereof, the fixing member 51 and the ring gear 9b can be in contact with each other over a long length, whereby falling of the ring gear 9b is effectively prevented. In addition, since oil mist inside the transmission case 3 enters into the engagement grooves 50, the contact portion between the fixing member 51 and the ring gear 9b is well lubricated, this improving the wearability thereat. Moreover, since the inserting portions of the fixing members 51 are situated inwardly of the skirt portion 3d, the outwardly projecting amount of the external configuration of the transmission case 3 can be minimized.

Figure 6:
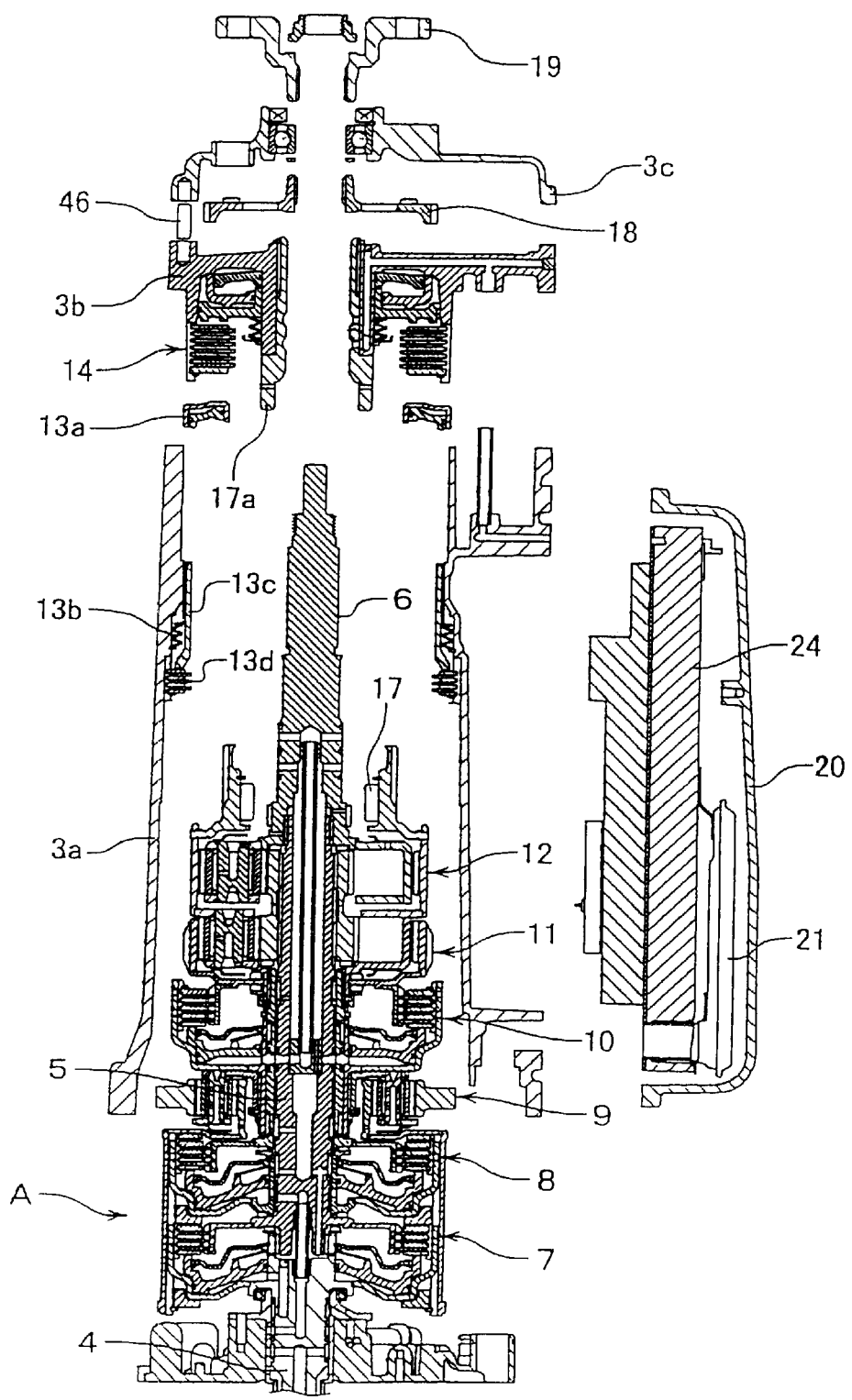
FIG. 6 is an exploded longitudinal sectional view of the transmission.

In assembling the transmission, with the torque converter case 2 being directed downwardly, the transmission constituent members such as the UD clutch 7, the OD clutch 8, the first planetary gear mechanism 9, the 35R clutch 10, the secondary planetary gear mechanism 11, the third planetary gear mechanism 12 and the one-way clutch 17 are assembled on the shaft member comprising the input shaft 4, the intermediate shaft 5 and the output shaft 6 axially sequentially in that order for subassembling a built-in subassembly as designated by reference character A in FIG. 6. Next, the case main body 3a to which the return spring 13b, the operation sleeve 13c and the disc portion 13d for the 26 brake 13 are assembled is placed over the built-in subassembly A from above, whereby the built-in subassembly A is accommodated in the case main body 3a.

Then, the actuator portion 13a for the 26 brake 13 is allowed to properly be dropped in the case main body 3a from above, and thereafter, the end piece 3b to which the LR brake 14 and the inner race 17a are assembled is tightly fastened to the case main body 3a with the inner bolts 45. Next, the parking gear 18 is assembled to the output shaft 6, and after the end cover 3c is mounted on the end piece 3b, the output flange 19 is assembled to the output shaft 6.

In addition, after the built-in subassembly A is accommodated in the case main body 3a, the fixing members 51 are inserted into the case main body 3a as described above so as to fix the ring gear 9b of the first planetary gear mechanism 9 to the case main body 3a, whereafter the oil pan 20 is attached to the skirt portion 3d of the case main body 3a.

In order to fix the ring gear 9b to the case main body 3a, although it may be possible to lock the ring gear 9b to the case main body 3a in the axial direction with a snap ring after the ring gear 9b is allowed to be splined to the case main body 3a, but with this construction, when the built-in subassembly A is assembled as described above, the UD clutch 7 and the OD clutch 8 are situated in front of the first planetary gear mechanism 9 when viewed from the open end of the case main body 3a which faces the torque converter case 2, and they hinder the placement of the snap ring in the case main body 3a as required. To cope with this, the plurality of transmission constituent members which are to be situated on the deepest end of the case main body 3a are first assembled sequentially into the case main body 3a, and after the first planetary gear mechanism 9 is assembled, the snap ring has to be mounted. On the contrary, according to the present invention, since the ring gear 9b can be fixed to the first planetary gear mechanism 9 by inserting the fixing members 51 into the case main body 3a from the outer surface of the circumferential wall portion of the case main body 3a, the fixing work of the ring gear 9b can be completed without any hindrance by the UD clutch 7 and the OD clutch 8. Consequently, the built-in subassembly A can be subassembled in the open space outside the transmission case, thereby making it possible to improve the assembling efficiency of transmissions.

Thus, while the transmission has been described heretofore which incorporates the planetary gear mechanism 9 in which the ring gear 9b functions as the element to be fixed to the transmission case 3, the present invention may be applied similarly to a transmission which incorporates a planetary gear mechanism in which for example a carrier functions as an element to be fixed to the transmission case.

While only certain embodiments of the invention have been specifically described herein, it will apparent that numerous modifications may be made thereto without departing from the spirit and scope of the invention.

As is clear from what has been described heretofore, according to the present invention, the element of the planetary gear mechanism which is to be fixed to the transmission case can be fixed thereto through operations from the outer surface of the circumferential wall portion of the transmission case, and owing to this, the transmission constituent members including the planetary gear mechanisms can be subassembled on the shaft member in the open space outside the transmission case, thereby making it possible to improve the assembling efficiency of transmissions.

The present disclosure relates to the subject matter contained in Japanese patent application No. Hei.11-142092 filed on May 21, 1999 which is expressly incorporated herein by reference in its entirety.

What is claimed is:

1. A transmission with a planetary gear mechanism, comprising:

a transmission case;

a fixing member insertable into the interior of said transmission case from an outer surface of a circumferential wall portion of said transmission case; and said planetary gear mechanism having an element to be fixed to said transmission case, said element comprising:

a first engagement portion engaging with said transmission case so as to prohibit the relative rotation of said element to said transmission case, said first engagement portion being a plurality of teeth corresponding to a plurality of groove portions of said transmission case; and a second engagement portion engaging with said fixing member so as to prohibit the relative axial movement of said element to said transmission case, said second engagement portion being an engagement groove extending along a direction perpendicular to an axial direction of the transmission and engaging with said fixing member, wherein said engagement groove is formed such as to at least partially penetrate said teeth in the thickness direction of said element.

2. The transmission according to claim 1, wherein both ends of said fixing member are supported on said transmission case.

3. The transmission according to claim 1, wherein said fixing member comprises a pair of fixing members, and said second engagement portion comprises a pair of second engagement portions disposed in parallel with each other.

4. The transmission according to claim 1, wherein said fixing member is inserted from the circumferential wall portion of a skirt portion of said transmission case, which accommodates an oil pan.

5. A method for assembling a transmission with a planetary gear mechanism according to claim 1, comprising the steps of:

assembling a plurality of transmission constituent members including said planetary gear mechanisms on a shaft member of said transmission axially sequentially in a predetermined order;

installing said plurality of transmission constituent members including said planetary gear mechanisms so assembled in said transmission case; and inserting said fixing members into the interior of said transmission case.

* * * * *